(12) United States Patent
Marcou et al.

(10) Patent No.: US 12,744,552 B2
(45) Date of Patent: Sep. 22, 2026

(54) SUPER-LATTICE CASTELLATED FIELD EFFECT TRANSISTOR (SLCFET) SWITCH SYSTEM

(71) Applicant: NORTHROP GRUMMAN SYSTEMS CORPORATION, Falls Church, VA (US)

(72) Inventors: Matthew Ambrose Marcou, Elgin, IL (US); Tyler J. O'Hara, Baltimore, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 346 days.

(21) Appl. No.: 18/472,855

(22) Filed: Sep. 22, 2023

(65) Prior Publication Data

US 2025/0105861 A1 Mar. 27, 2025

(51) Int. Cl.

*H04B 1/04* (2006.01)
*H01Q 5/335* (2015.01)
*H04B 1/30* (2006.01)

(52) U.S. Cl.

CPC ............... *H04B 1/04* (2013.01); *H01Q 5/335* (2015.01); *H04B 1/30* (2013.01); *H04B 2001/305* (2013.01)

(58) Field of Classification Search

CPC ............... H03K 17/693; H03K 17/102; H03K 2217/0018; H03K 17/687; H03K 17/6871;

(Continued)

(56) References Cited

U.S. PATENT DOCUMENTS 10,886,911 B2 * 1/2021 Willard ................ H10D 86/201
2011/0105055 A1 5/2011 Ilkov (Continued)

FOREIGN PATENT DOCUMENTS

DE 102022203190 A1 * 10/2022 ....... H03K 17/08104
EP 4009524 A1 * 6/2022 ............... H04B 1/40

OTHER PUBLICATIONS

WOISR (Notification of Transmittal of the International Search Report and the Written Opinion of the International Searching Authority, or the Declaration) mailed Nov. 4, 2024 for corresponding PCT/US2024/038189.

(Continued)

*Primary Examiner* — Golam Sorowar
(74) *Attorney, Agent, or Firm* — Renner Otto Boisselle Sklar LLP; Christopher P. Harris

(57) ABSTRACT

One example includes a super-lattice castellated field effect transistor (SLCFET) system. The system includes a plurality of SLCFETs arranged in a series stack between a first port and a second port to provide a propagation path of a radio frequency (RF) signal between the first port and the second port in response to activation of the SLCFETs. The system also includes a plurality of gate resistors interconnecting gate terminals associated with each of the respective SLCFETs and an activation port to which an activation signal is provided to concurrently activate the SLCFETs. The system further includes a plurality of balancing resistors coupled to the gate terminals associated with each of the respective SLCFETs, the balancing resistors being configured to approximately equalize a drain-gate voltage and a gate-source voltage associated with each of the SLCFETs when activated.

19 Claims, 4 Drawing Sheets

(58) Field of Classification Search
CPC .. H03K 17/161; H03K 17/162; H03K 17/302; H03K 2217/0036; H03K 5/08; H03K 5/082; H03K 17/6872; H03K 17/04106; H03K 3/012; H03K 17/063; H03K 17/16; H03K 17/04206; H03K 19/0005; H03K 2017/066; H03K 2217/0054; H03K 17/56; H03F 2200/451; H03F 1/223; H03F 2200/294; H03F 3/72; H03F 3/193; H03F 1/56; H03F 3/211; H03F 1/0277; H03F 3/195; H03F 2200/18; H03F 1/0205; H03F 2200/387; H03F 1/0227; H03F 1/3247; H03F 2200/102; H03F 1/22; H03F 3/21; H03F 3/24; H03F 3/45098; H04B 1/48; H04B 1/44; H04B 1/18; H04B 1/0458; H04B 1/006; H04B 1/1036; H04B 2001/0408; H04B 1/16; H04B 1/40; H04B 1/401; H04B 17/14; H04B 1/0053; H04B 1/04; H04B 1/0475; H04B 1/123
See application file for complete search history.

(56) References Cited

U.S. PATENT DOCUMENTS

| | | | | |
|---|---|---|---|---|
| 2014/0009214 | A1 | 1/2014 | Altunkilic et al. | |
| 2016/0329891 | A1 | 11/2016 | Bakalski et al. | |
| 2019/0214984 | A1 | 7/2019 | Blin | |
| 2020/0153425 | A1 | 5/2020 | Ranta et al. | |
| 2021/0167773 | A1 | 6/2021 | Burgener et al. | |
| 2021/0391858 | A1* | 12/2021 | Shapiro ................ | H03K 17/693 |
| 2022/0286123 | A1* | 9/2022 | Malladi ................ | H03K 17/693 |
| 2022/0321119 | A1* | 10/2022 | Lam ..................... | H03K 17/693 |
| 2023/0299745 | A1 | 9/2023 | Torpey et al. | |

OTHER PUBLICATIONS

TWOA: Office Action issued Mar. 27, 2025 for corresponding TW application No. 113127217; attached with English translation provided by TW associate.

* cited by examiner

SUPER-LATTICE CASTELLATED FIELD EFFECT TRANSISTOR (SLCFET) SWITCH SYSTEM

TECHNICAL FIELD

The present disclosure relates generally to communication systems, and specifically to a SLCFET switch system.

BACKGROUND

Radio frequency (RF) communications have long been and will continue to be a very prevalent manner of wireless communication. Switching devices that are capable of selectively routing RF signals, particularly high power and high frequency RF signals, are necessary for fabricating communication devices, particularly as electronic devices are fabricated in smaller form-factors. One such switching device that can handle RF signals is a super-lattice castellated field effect transistor (SLCFET) that can be activated to propagate high frequency RF signals therethrough. However, SLCFETs can have limitations with respect to power requirements of such RF signals, and can provide losses and non-linearities based on the switching device designs that incorporate SLCFET devices.

SUMMARY

One example includes a super-lattice castellated field effect transistor (SLCFET) system. The system includes a plurality of SLCFETs arranged in a series stack between a first port and a second port to provide a propagation path of a radio frequency (RF) signal between the first port and the second port in response to activation of the SLCFETs. The system also includes a plurality of gate resistors interconnecting gate terminals associated with each of the respective SLCFETs and an activation port to which an activation signal is provided to concurrently activate the SLCFETs. The system further includes a plurality of balancing resistors coupled to the gate terminals associated with each of the respective SLCFETs, the balancing resistors being configured to approximately equalize a drain-gate voltage and a gate-source voltage associated with each of the SLCFETs when activated.

Another example includes a method for fabricating a SLCFET switch system. The method includes forming a plurality of SLCFETs in a series stack between a first port and a second port. The method also includes forming a plurality of gate resistors interconnecting gate terminals associated with each of the respective SLCFETs and an activation port. The method further includes forming a plurality of balancing resistors coupled to the gate terminals associated with each of the respective SLCFETs.

Another example includes a complement switch system. The system includes an input/output (I/O) port impedance matching network arranged between an I/O port and a complement node, and an I/O terminal impedance matching network arranged between an I/O terminal and the common node. The system also includes a first SLCFET system. The first SLCFET system includes a first plurality of SLCFETs arranged in a first series stack between the complement node and a low voltage rail to provide a propagation path of a radio frequency (RF) signal between the complement node and the low-voltage rail in response to activation of the first SLCFETs. The first SLCFET system also includes a first plurality of gate resistors interconnecting gate terminals associated with each of the respective first SLCFETs and a first activation port to which an activation signal is provided to concurrently activate the first SLCFETs. The first SLCFET system further includes a first plurality of balancing resistors coupled to the gate terminals associated with each of the respective first SLCFETs, the first balancing resistors being configured to approximately equalize a drain-gate voltage and a gate-source voltage associated with each of the first SLCFETs when activated. The system further includes a second SLCFET system. The second SLCFET system includes a second plurality of SLCFETs arranged in a second series stack between the common node and the complement node to provide a propagation path of the RF signal between the common node and the complement node in response to activation of the second SLCFETs. The second SLCFET system also includes a second plurality of gate resistors interconnecting the gate terminals associated with each of the respective second SLCFETs and a second activation port to which a complement of the activation signal is provided to concurrently activate the second SLCFETs. The second SLCFET system further includes a second plurality of balancing resistors coupled to the gate terminals associated with each of the respective second SLCFETs, the second balancing resistors being configured to approximately equalize a drain-gate voltage and a gate-source voltage associated with each of the second SLCFETs when activated.

DETAILED DESCRIPTION

Figure 1:
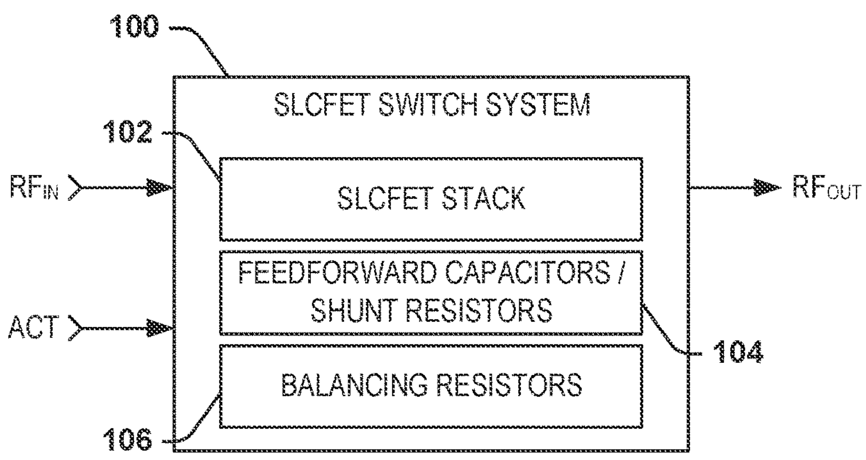
FIG. 1 illustrates an example block diagram of a SLCFET switch system.

The present disclosure relates generally to communication systems, and specifically to a super-lattice castellated field effect transistor (SLCFET) switch system. The SLCFET switch system can be implemented in any of a variety of high-frequency high-power RF communications applications, such as for switching signal paths between transmit and receive in an antenna system. The SLCFET switch system can provide for propagation of an RF signal therethrough in an activated state to provide for low-losses and for mitigating non-linearities of the RF signal. As an example, the SLCFET switch system can be implemented in a complementary switch system that provides a signal path and a shunt path for the RF signal in an RF switching application.

The SLCFET switch system can include a plurality of SLCFETs that are arranged in a series stack. As an example, the SLCFETs can be any of a variety of SLCFET devices, such as a metal semiconductor field effect transistor (MESFET). As described herein, the terms "series" and "series stack" refer to a coupling of the source of one SLCFET to a drain of a next SLCFET in a sequence along the series stack of SLCFETs. Therefore, in response to concurrent activation of the SLCFETs, the channels of the SLCFETs through the drain-to-source connections can provide for a propagation path of an RF signal. As also described herein, the terms “activate” and “activation”, as describing a transistor (e.g., the SLCFETs herein), refer to providing sufficient bias (e.g., gate-source voltage) to operate the transistor device in resistive mode. Similarly, the terms “deactivate” and “deactivation”, as describing a transistor (e.g., the SLCFETs herein), refer to removing bias to operate the transistor device in cutoff mode. Therefore, the propagation path of the RF signal through the series stack of the SLCFETs can be such that the series stack of the activated SLCFETs can accommodate approximately the full amplitude of the current associated with the RF signal without saturating the SLCFETs.

The series arrangement of the SLCFETs can be such that the peak voltage of the RF signal can be distributed across each of the SLCFETs (e.g., as VDS). As an example, the SLCFETs can be fabricated in a manner such that the drain and source metals of respective SLCFET devices in the series sequence can be overlapping or integral to mitigate parasitic capacitance. Additionally, the SLCFET switch system can include a plurality of feedforward capacitors and feedforward resistors that are each arranged in parallel with each other and with the drain-source channels of each of the respective SLCFETs. Therefore, the feedforward capacitors and shunt resistors can provide for a substantially balanced voltage swing of the RF signal in a deactivated state, as well, without the high-power RF signal conducting through the channels of the SLCFETs in the series stack.

In addition, as described herein, the SLCFET switch system can include a plurality of balancing resistors that are configured to approximately equalize a drain-gate voltage and a gate-source voltage associated with each of the SLCFETs when the respective SLCFETs are activated. For example, the balancing resistors can provide a current path for a balancing current associated with the RF signal that propagates between from a drain to a gate of each of the SLCFETs. Because a portion of the AC current associated with the RF signal can propagate through a gate resistor associated with each of the SLCFETs, the balancing current can be provided as approximately equal to the gate current through each of the gate resistors when the SLCFETs are activated to compensate for the gate current to balance the drain-gate voltage and a gate-source voltage associated with each of the SLCFETs. Accordingly, the balanced drain-gate voltage and a gate-source voltage associated with each of the SLCFETs can provide for a more linear propagation of the RF signal with minimal losses.

FIG. 1 illustrates an example block diagram of a SLCFET switch system 100. The SLCFET switch system 100 can be implemented in any of a variety of high-frequency high-power RF communications applications, such as for switching signal paths between transmit and receive in an antenna system.

The SLCFET switch system 100 includes a plurality of SLCFETs 102 that can be arranged in a series stack, and are thus demonstrated in the example of FIG. 1 as a “SLCFET STACK”. As an example, the SLCFETs can be any of a variety of SLCFET devices, such as a metal semiconductor field effect transistor (MESFET). Therefore, in response to concurrent activation of the SLCFETs 102, the channels of the SLCFETs 102 through the drain-to-source connections can provide for a propagation path of an input RF signal. The RF signal is demonstrated as being input to the SLCFET switch system 100 as an input RF signal $RF_{IN}$ and as being output from the SLCFET switch system 100 as an output RF signal $RF_{OUT}$, having propagated through the activated SLCFETs 102. Therefore, the propagation path of the RF signal (described hereinafter as the RF signal $RF_{IN}$) through the series stack of the SLCFETs 102 can be such that the series stack of the activated SLCFETs 102 can accommodate approximately the full amplitude of the current associated with the RF signal without saturating the SLCFETs 102.

The series arrangement of the SLCFETs 102 can be such that the peak voltage of the RF signal can be distributed across each of the SLCFETs 102 (e.g., as VDS). As an example, the SLCFETs 102 can be fabricated in a manner such that the drain and source metals of respective SLCFETs 102 in the series sequence can be overlapping or integral to mitigate parasitic capacitance. In the example of FIG. 1, the SLCFET switch system 100 includes a plurality of feedforward capacitors and shunt resistors 104, demonstrated as “FEEDFORWARD CAPACITORS/SHUNT RESISTORS”) that can each be arranged in parallel with each other and with the drain-source channels of each of the respective SLCFETs 102. Therefore, the feedforward capacitors and shunt resistors 104 can provide for a substantially balanced voltage swing of the RF signal $RF_{IN}$ in a deactivated state, as well, without the high-power RF signal $RF_{IN}$ conducting through the channels of the SLCFETs 102 in the series stack.

As an example, the gate terminals of each of the SLCFETs 102 can include a gate resistor that can facilitate a sufficient maximum control voltage (e.g., Vas) for activation of the SLCFETs 102. However, in response to conduction of AC current associated with the RF signal $RF_{IN}$ through the SLCFETs 102, a portion of the AC current is conducted through the gate resistors. As a result, absent any compensation current, the current flow through the gate resistor can unbalance the current that flows between the drain and the gate of the SLCFETs 102 and that flows between the gate and the source of the SLCFETs 102. Such current imbalance can thus result in an imbalance between the drain-gate voltage and a gate-source voltage associated with each of the SLCFETs 102. The RF signal $RF_{IN}$ could thus exhibit non-linearities and/or losses based on the imbalanced drain-gate and gate-source voltages.

To balance the AC currents, and thus the drain-gate and gate-source voltages, of the SLCFETs 102, the SLCFET switch system 100 can include a plurality of balancing resistors 106 that are configured to approximately equalize a drain-gate voltage and a gate-source voltage associated with each of the SLCFETs 102 when the respective SLCFETs 102 are activated. The balancing resistors 106 can be coupled to provide a current path for a balancing current that can be approximately equal (e.g., equal and opposite) to the gate current through the gate resistors. As a first example, the balancing resistors 106 can include a first balancing resistor 106 that is coupled between a gate and a drain of a first one of the SLCFETs 102, and the remaining balancing resistors 106 can interconnect the gate terminals of pairs of the SLCFETs 102 in the sequence. In the first example, the SLCFET switch system 100 can include a DC-blocking capacitor arranged in series with the first balancing resistor 106 to provide DC filtering of the AC current associated with the RF signal $RF_{IN}$. As a second example, each of the balancing resistors 106 can be arranged in series with a DC-blocking capacitor between the gate and the drain of each of the SLCFETs 102. In either example, the balancing resistors 106 compensate for the portion of the AC current flow associated with the RF signal $RF_{IN}$ through the gate resistors, thereby balancing the drain-gate voltage and a gate-source voltage associated with each of the SLCFETs 102. Accordingly, the balanced drain-gate voltage and a gate-source voltage associated with each of the SLCFETs 102 can provide for a more linear propagation of the RF signal with minimal losses.

Figure 2:
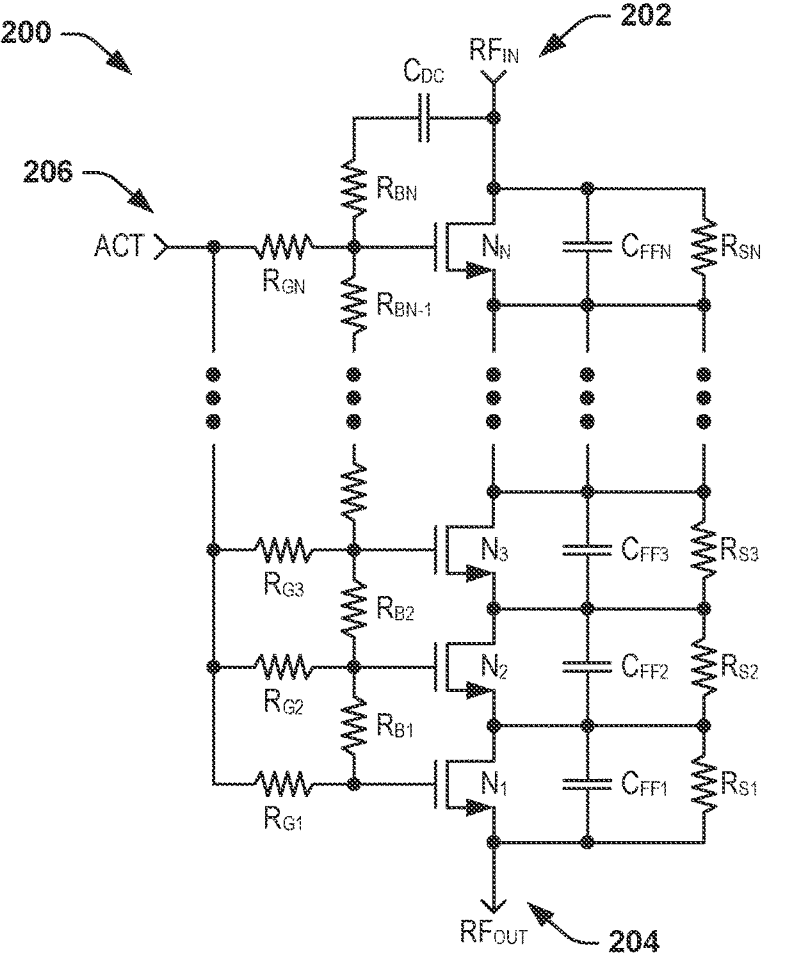
FIG. 2 illustrates an example circuit diagram of a SLCFET switch system.

FIG. 2 illustrates an example circuit diagram of a SLCFET switch system 200. The SLCFET switch system 200 can correspond to the SLCFET switch system 100 in the example of FIG. 1. Therefore, reference is to be made to the example of FIG. 1 in the following description of the example of FIG. 2.

The SLCFET switch system 200 includes a plurality N of SLCFETs, demonstrated as N-FET devices $N_1$ through $N_N$, where N is an integer greater than one. The SLCFETs $N_1$ through $N_N$ are demonstrated as arranged in a series stack such that the source of one SLCFET is coupled to a drain of a next SLCFET in the series sequence. Therefore, in response to concurrent activation of the SLCFETs $N_1$ through $N_N$, the channels of the SLCFETs $N_1$ through $N_N$ through the drain-to-source connections can provide for a propagation path of the input RF signal $RF_{IN}$ provided to the SLCFET switch system 200 at a first port 202 and provided from a second port 204 as an output RF signal $RF_{OUT}$. Therefore, as described above, the propagation path of the RF signal (described hereinafter as the RF signal $RF_{IN}$) through the series stack of the SLCFETs $N_1$ through $N_N$ can provide that the peak voltage of the RF signal $RF_{IN}$ is distributed across each of the SLCFETs $N_1$ through $N_N$ (e.g., as VDS) to accommodate approximately the full amplitude of the current associated with the RF signal $RF_{IN}$ without saturating the SLCFETs $N_1$ through $N_N$.

In the example of FIG. 2, the SLCFET switch system 200 includes a plurality of feedforward capacitors $C_{FF1}$ through CFEN and shunt resistors $R_{S1}$ through $R_{SN}$. The feedforward capacitors $C_{FF1}$ through CFEN are each arranged in parallel with the drain-source channels of each of the respective SLCFETs $N_1$ through $N_N$, and the shunt resistors $R_{S1}$ through $R_{SN}$ are each arranged in parallel with the feedforward capacitors $C_{FF1}$ through CFEN and with the drain-source channels of each of the respective SLCFETs $N_1$ through $N_N$. Therefore, the feedforward capacitors $C_{FF1}$ through CFEN and shunt resistors $R_{S1}$ through $R_{SN}$ can provide for a substantially balanced voltage swing of the RF signal $RF_{IN}$ in a deactivated state of the SLCFETs $N_1$ through $N_N$ without the high-power RF signal $RF_{IN}$ conducting through the channels of the SLCFETs $N_1$ through $N_N$ in the series stack.

As also demonstrated in the example of FIG. 2, the SLCFET switch system 200 includes a set of gate resistors $R_{G1}$ through $R_{GN}$ that are each coupled between an activation port 206 and a gate terminal of a respective one of the SLCFETs $N_1$ through $N_N$. The activation port 206 is configured to receive an activation signal ACT to concurrently activate the SLCFETs $N_1$ through $N_N$. As an example, the gate resistors $R_{G1}$ through $R_{GN}$ can have resistance values that are selected based on the desired switching speed of the SLCFET switch system 200 and to facilitate a sufficient maximum control voltage (e.g., Vas) for activation of the SLCFETs $N_1$ through $N_N$.

The SLCFET switch system 200 further includes a DC-blocking capacitor $C_{DC}$ and a set of balancing resistors $R_{B1}$ through $R_{BN}$. The DC-blocking capacitor $C_{DC}$ and a first one of the balancing resistors $R_{BN}$ are provided in series between a gate of the first SLCFET $N_N$ and the first port 202. The remaining balancing resistors $R_{B1}$ through $R_{BN-1}$ are provided between gate terminals of pairs of the SLCFETs $N_1$ through $N_N$. The DC-blocking capacitor $C_{DC}$ and the balancing resistors $R_{B1}$ through $R_{BN}$ can provide a current path for a balancing current during activation of the SLCFETs $N_1$ through $N_N$. The balancing current can thus compensate for the gate current through the gate resistors $R_{G1}$ through $R_{GN}$. Therefore, balancing current through the balancing resistors $R_{B1}$ through $R_{BN}$ can balance the drain-gate voltage and a gate-source voltage associated with each of the SLCFETs $N_1$ through $N_N$.

The resistance values $R_{B1}$ through $R_{BN}$ (italicized to distinguish resistance values from balancing resistor labels) of the respective balancing resistors $R_{B1}$ through $R_{BN}$ can be selected to provide the balancing current for each of the SLCFETs to be approximately equal to the gate current for the respective one of the gate resistors $R_{G1}$ through $R_{GN}$. Therefore, the resistance values $R_{B1}$ through $R_{BN}$ can be selected to properly compensate for the gate currents to balance the drain-gate voltage and a gate-source voltage associated with each of the SLCFETs $N_1$ through $N_N$. As an example, the resistance value $R_k$ of each of the respective balancing resistors $R_{B1}$ through $R_{BN}$, where k is the index number of the respective one of the balancing resistors (k=1 through N), can be selected based on the following equations:

Resistance $R_{B1}$ (k=1) of the last balancing resistor ($R_{B1}$):

$$R_{B1} = 2 * R_g \qquad \text{Equation 1}$$

Where: $R_g$ is the resistance value of the gate resistors $R_{G1}$ through $R_{GN}$.

Resistance $R_k$ (k=2 through N−1) of each of the intermediate balancing resistors ($R_{B2}$ through $R_{BN-1}$):

$$R_k = \left(\frac{1}{R_{k-1}} + \frac{2N-1}{R_g}\right)^{-1} \qquad \text{Equation 2}$$

Where: N is the quantity of SLCFETs/balancing resistors.

Resistance $R_{BN}$ (k=N) of the first balancing resistor ($R_{BN}$):

$$R_{BN} = \left(\frac{2}{R_{N-1}} + \frac{2N-1}{R_g}\right)^{-1} \qquad \text{Equation 3}$$

Figure 3:
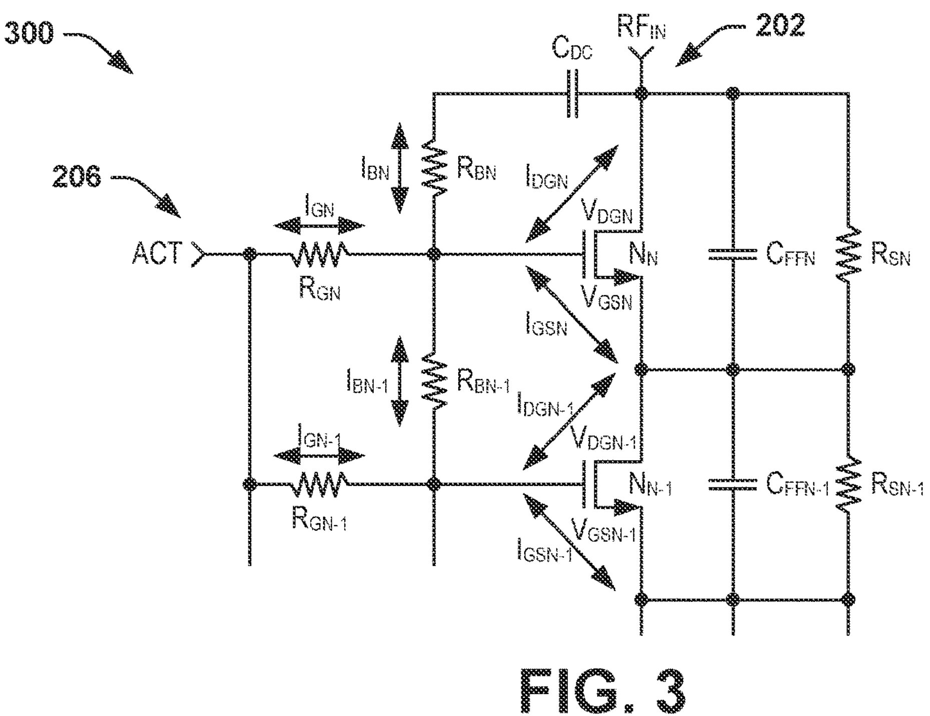
FIG. 3 illustrates an example diagram of current flow in a SLCFET switch system.

FIG. 3 illustrates an example diagram 300 of current flow in the SLCFET switch system 200. The diagram 300 in the example of FIG. 3 demonstrates the AC currents associated with the RF signal $RF_{IN}$ in the SLCFET switch system 200. Therefore, like reference numbers and labels are used in the example of FIG. 3 as are provided in the example of FIG. 2.

The diagram 300 only demonstrates a portion of the SLCFET switch system 200, and thus just the first two of the SLCFETs $N_1$ and $N_2$. In the example of FIG. 3, the activation signal ACT is provided at the activation port 206 to concurrently activate the SLCFETs $N_1$ through $N_N$. In response, the RF signal $RF_{IN}$ is provided to the first port 202. As a result, an AC current portion of the RF signal $RF_{IN}$ flows through the SLCFETs $N_1$ through $N_N$. The DC-blocking capacitor $C_{DC}$ filters the DC component of the current associated with the RF signal $RF_{IN}$ through the balancing resistors $R_{B1}$ through $R_{BN}$. Thus, in the example of FIG. 3, the AC currents are demonstrated as bidirectional based on the AC current flow of the RF signal $RF_{IN}$.

The AC currents associated with the RF signal $RF_{IN}$ include currents through the first SLCFET $N_N$. The currents through the first SLCFET $N_N$ include a drain-gate current $I_{DGN}$ and a gate-source current $I_{GSN}$. The drain-gate current $I_{DGN}$ thus provides for a drain-gate voltage $V_{DGN}$ between the drain and the gate of the first SLCFET $N_N$, and the gate-source current $I_{GSN}$ thus provides for a gate-source voltage $V_{GSN}$ between the gate and the source of the first SLCFET $N_N$. If the amplitudes of the drain-gate voltage $V_{DGN}$ and the gate-source voltage $V_{GSN}$ are approximately equal, then the SLCFET $N_N$ can exhibit suitable operational characteristics to provide for enhanced linearity and low-loss propagation of the high-frequency and high-power RF signal $RF_{IN}$.

However, absent the current compensation described in greater detail below, because of the arrangement of the gate resistor $R_{GN}$ at the gate of the first SLCFET $N_N$, a portion of the amplitude of the AC current of the RF signal $RF_{IN}$ flows through the gate resistor $R_{GN}$. For example, in a first cycle of the AC current flow, a portion of the drain-gate current $I_{DGN}$ flows from the gate of the SLCFET $N_N$ to the activation port 206 through the gate resistor $R_{GN}$ as a gate current $I_{GN}$, thereby providing the drain-gate current $I_{DGN}$ as being greater than the gate-source current $I_{GSN}$ by an amplitude that is approximately equal to the gate current $I_{GN}$. Similarly, in a second cycle of the AC current flow, a portion of the gate-source current $I_{GSN}$ flows from the activation port 206 to the gate of the SLCFET $N_N$ through the gate resistor $R_{GN}$ as the gate current $I_{GN}$, thereby providing the gate-source current $I_{GSN}$ as being greater than the drain-gate current $I_{DGN}$ by an amplitude that is approximately equal to the gate current $I_{GN}$. Therefore, in the first cycle of the AC current flow, the gate-source voltage $V_{GSN}$ is greater than the drain-gate voltage $V_{DGN}$, and in the second cycle of the AC current flow, the drain-gate voltage $V_{DGN}$ is greater than the gate-source voltage $V_{GSN}$. The oscillation of the imbalanced drain-gate voltage $V_{DGN}$ and the gate-source voltage $V_{GSN}$ can thus result in nonlinearity of the RF signal $RF_{IN}$ propagating through the SLCFET switch system 200.

As described above, the balancing resistors $R_{B1}$ through $R_{BN}$ are configured to provide a current path for a balancing current $I_B$. The balancing current $I_B$ can be approximately equal to the gate current to balance the current amplitudes between the drain-gate current $I_{DGN}$ and the gate-source current $I_{GSN}$, and thus approximately equalizes the drain-gate voltage $V_{DGN}$ and the gate-source voltage $V_{GSN}$. For example, in the first cycle of the AC current flow, the portion of the drain-gate current $I_{DGN}$ flows from the gate of the SLCFET $N_N$ to the activation port 206 through the gate resistor $R_{GN}$ as the gate current $I_{GN}$. However, the balancing current $I_{BN}$ is likewise provided to the gate of the SLCFET $N_N$ in the first cycle. Because the balancing current $I_{BN}$ is approximately equal to the gate current $I_{GN}$, the net difference between the drain-gate current $I_{DGN}$ and the gate-source current $I_{GSN}$ is approximately zero. Similarly, in the second cycle of the AC current flow, the portion of the gate-source current $I_{GSN}$ flows from the activation port 206 to the gate of the SLCFET $N_N$ through the gate resistor $R_{GN}$ as the gate current $I_{GN}$. However, the balancing current $I_{BN}$ is likewise provided from the gate of the SLCFET $N_N$ in the second cycle. Because the balancing current $I_{BN}$ is approximately equal to the gate current $I_{GN}$, the net difference between the drain-gate current $I_{DGN}$ and the gate-source current $I_{GSN}$ is again approximately zero. Therefore, the drain-gate voltage $V_{DGN}$ and the gate-source voltage $V_{GSN}$ can be approximately equalized in each of the cycles of the AC current associated with the RF signal $RF_{IN}$.

The diagram 300 demonstrates a same distribution of the AC current flows associated with the RF signal $RF_{IN}$ with respect to the second SLCFET $N_{N-1}$. Particularly, in the first cycle of the AC current flow, the portion of the drain-gate current $I_{DGN-1}$ flows from the gate of the SLCFET $N_{N-1}$ to the activation port 206 through the gate resistor $R_{GN-1}$ as the gate current $I_{GN-1}$ and the balancing current $I_{BN-1}$ is likewise provided to the gate of the SLCFET $N_{N-1}$. Therefore, the net difference between the drain-gate current $I_{DGN-1}$ and the gate-source current $I_{GSN-1}$ is approximately zero. Similarly, in the first cycle of the AC current flow, the portion of the drain-gate current $I_{DGN-1}$ flows from the gate of the SLCFET $N_{N-1}$ to the activation port 206 through the gate resistor $R_{GN-1}$ as the gate current $I_{GN-1}$ and the balancing current $I_{BN-1}$ is likewise provided to the gate of the SLCFET $N_{N-1}$. Therefore, the net difference between the drain-gate current $I_{DGN-1}$ and the gate-source current $I_{GSN-1}$ is approximately zero. The same AC current distribution is provided at each of the SLCFETs $N_1$ through $N_N$ of the SLCFET switch system 200, thereby providing approximately equalization of the drain-gate voltages VDG and gate-source voltages VGS of the SLCFETs $N_1$ through $N_N$ to provide for enhanced linearity of the RF signal $RF_{IN}$ propagating through the SLCFET switch system 200.

Figure 4:
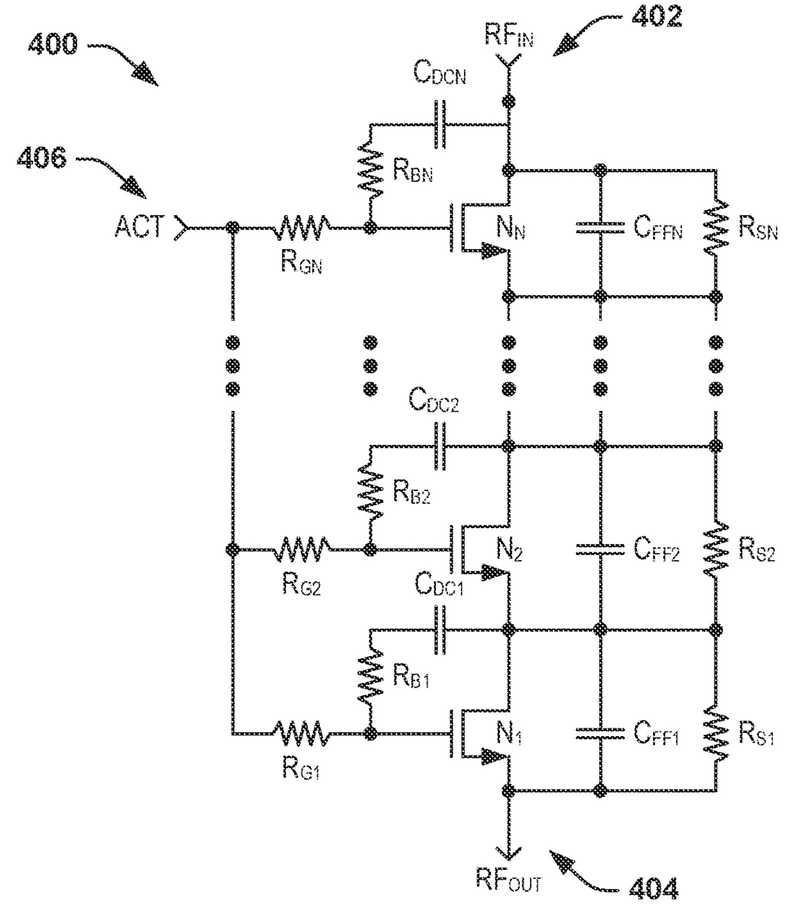
FIG. 4 illustrates another example circuit diagram of a SLCFET switch system.

FIG. 4 illustrates another example circuit diagram of a SLCFET switch system 400. The SLCFET switch system 400 can correspond to the SLCFET switch system 100 in the example of FIG. 1. Therefore, reference is to be made to the example of FIG. 1 in the following description of the example of FIG. 4.

Similar to the SLCFET switch system 200 in the example of FIG. 2, the SLCFET switch system 400 includes a plurality N of SLCFETs, demonstrated as N-FET devices $N_1$ through $N_N$, where N is an integer greater than one. The SLCFETs $N_1$ through $N_N$ are demonstrated as arranged in a series stack such that the source of one SLCFET is coupled to a drain of a next SLCFET in the series sequence. Therefore, in response to concurrent activation of the SLCFETs $N_1$ through $N_N$, the channels of the SLCFETs $N_1$ through $N_N$ through the drain-to-source connections can provide for a propagation path of the input RF signal $RF_{IN}$ provided to the SLCFET switch system 400 at a first port 402 and provided from a second port 404 as an output RF signal $RF_{OUT}$.

Also similar to the SLCFET switch system 200 in the example of FIG. 2, the SLCFET switch system 400 includes a plurality of feedforward capacitors $C_{FF1}$ through $C_{FFN}$ and shunt resistors $R_{S1}$ through $R_{SN}$. The feedforward capacitors $C_{FF1}$ through CFEN are each arranged in parallel with the drain-source channels of each of the respective SLCFETs $N_1$ through $N_N$, and the shunt resistors $R_{S1}$ through $R_{SN}$ are each arranged in parallel with the feedforward capacitors $C_{FF1}$ through CFEN and with the drain-source channels of each of the respective SLCFETs $N_1$ through $N_N$. Therefore, the feedforward capacitors $C_{FF1}$ through $C_{FFN}$ and shunt resistors $R_{S1}$ through $R_{SN}$ can provide for a substantially balanced voltage swing of the RF signal $RF_{IN}$ in a deactivated state of the SLCFETs $N_1$ through $N_N$ without the high-power RF signal $RF_{IN}$ conducting through the channels of the SLCFETs $N_1$ through $N_N$ in the series stack.

As also demonstrated in the example of FIG. 4, the SLCFET switch system 400 includes a set of gate resistors $R_{G1}$ through $R_{GN}$ that are each coupled between an activation port 406 and a gate terminal of a respective one of the SLCFETs $N_1$ through $N_N$. The activation port 406 is configured to receive an activation signal ACT to concurrently activate the SLCFETs $N_1$ through $N_N$. As an example, the gate resistors $R_{G1}$ through $R_{GN}$ can have resistance values that are selected based on the desired switching speed of the SLCFET switch system 400 and to facilitate a sufficient maximum control voltage (e.g., Vas) for activation of the SLCFETs $N_1$ through $N_N$.

The SLCFET switch system 400 further includes a plurality of DC-blocking capacitors $C_{DC1}$ through $C_{DCN}$ and a set of balancing resistors $R_{B1}$ through $R_{BN}$. Each of the DC-blocking capacitors $C_{DC1}$ through $C_{DCN}$ and a respective one of the balancing resistors $R_{B1}$ through $R_{BN}$ are provided in series between a gate and a drain of a respective one of the SLCFETs $N_1$ through $N_N$. Therefore, each of the DC-blocking capacitors $C_{DC1}$ through $C_{DCN}$ and the respective one of the balancing resistors $R_{B1}$ through $R_{BN}$ can provide a separate respective current path for one of the balancing currents $I_{B1}$ through $I_{BN}$ that is provided through a respective one of the balancing resistors $R_{B1}$ through $R_{BN}$ in parallel with a respective one of the drain-gate currents $I_{DG1}$ through $I_{DGN}$. Similar to as described above, the balancing current $I_B$ can thus compensate for the gate current through the gate resistors $R_{G1}$ through $R_{GN}$. Therefore, balancing current through the balancing resistors $R_{B1}$ through $R_{BN}$ can balance the drain-gate voltage and a gate-source voltage associated with each of the SLCFETs $N_1$ through $N_N$.

Similar to as described above, the resistance values $R_{B1}$ through $R_{BN}$ of the balancing resistors $R_{B1}$ through $R_{BN}$ can be selected to provide the balancing current for each of the SLCFETs to be approximately equal to the gate current for the respective one of the gate resistors. Therefore, the resistance values $R_{B1}$ through $R_{BN}$ can be selected to properly compensate for the gate currents to balance the drain-gate voltage and a gate-source voltage associated with each of the SLCFETs $N_1$ through $N_N$. As an example, the resistance values $R_{B1}$ through $R_{BN}$ of the balancing resistors $R_{B1}$ through $R_{BN}$ can be selected based on the following equation:

$$R_k = \left(\frac{R_g}{2 * k - 1}\right) \quad \text{Equation 4}$$

Where: k is the index number of the respective one of the balancing resistors.

Figure 5:
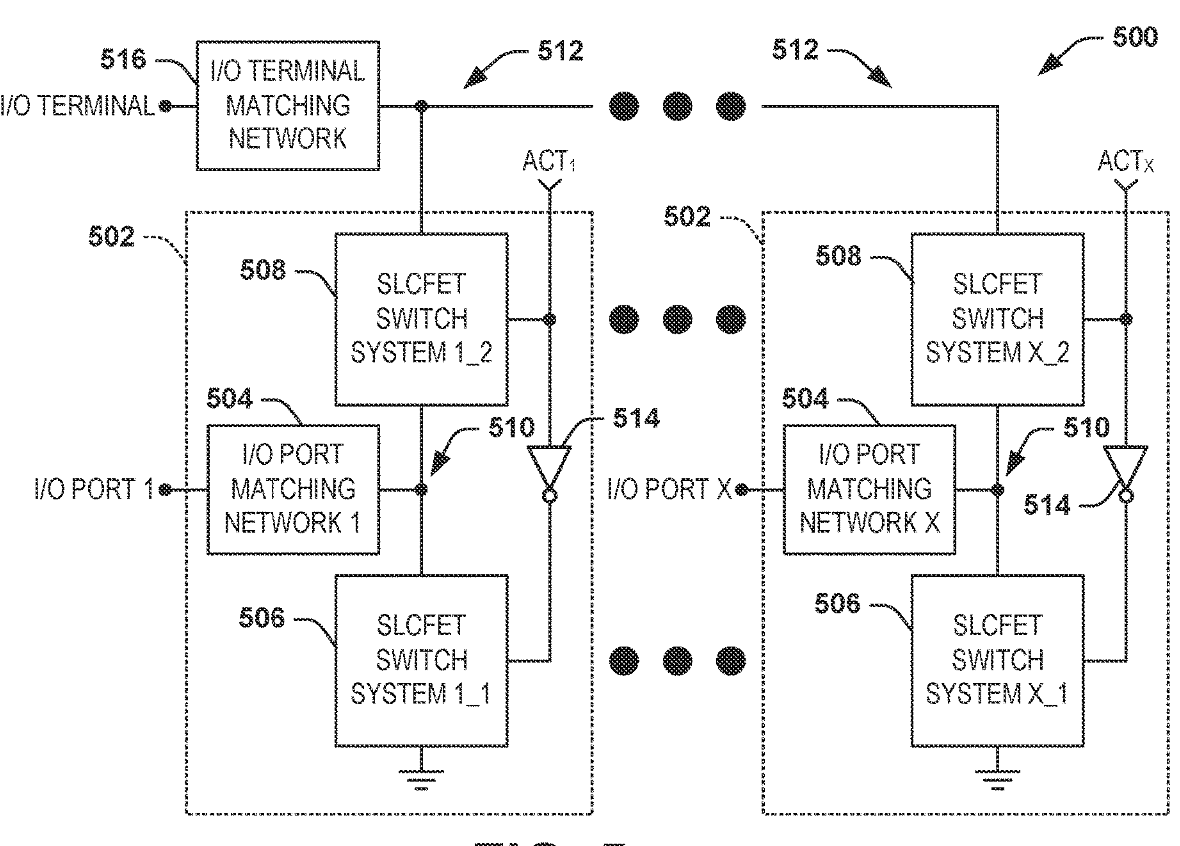
FIG. 5 illustrates an example of an RF switch system.

FIG. 5 illustrates an example of an RF switch system 500. The RF switch system 500 includes a plurality X of complementary switch systems 502, where X is an integer greater than zero. The RF switch system 500 can be implemented in any of a variety of applications in which an RF signal is switched between multiple inputs and/or outputs, such as an antenna system.

Each of the complementary switch systems 502 includes an input/output port, demonstrated as I/O port 1 through I/O port X that can correspond to one of an input or an output for the respective complementary switch system 502. Each of the complementary switch systems 502 also includes an I/O port matching network 504 that can correspond to an impedance matching network for an RF signal that propagates into or from the respective I/O port. Each of the complementary switch systems 502 further includes a first SLCFET switch system 506 and a second SLCFET switch system 508. The first SLCFET switch system 506 is demonstrated as interconnecting a complement node 510 and a low-voltage rail (e.g., ground), and the second SLCFET switch system 508 is demonstrated as interconnecting the complement node 510 and a common node 512. Each of the complementary switch systems 502 is provided a respective activation signal, demonstrated as $ACT_1$ through $ACT_X$. The respective activation signal ACT is provided to the second SLCFET switch system 508 in each of the complementary switch systems 502 and to an inverter 514 that provides a complement of the activation signal ACT to the first SLCFET switch system 506. Therefore, one of the SLCFET switch systems 506 and 508 is activated at a given time to either couple the respective I/O port to ground or to couple the I/O port to the common node 512 via the complement node 510.

The common node 512 is coupled to an I/O terminal via an I/O terminal matching network 516. The I/O matching network can correspond to an impedance matching network for the RF signal that propagates into or from the respective I/O terminal. Therefore, the I/O terminal can correspond to a common input or output terminal for an RF signal to propagate to and/or from a given one of the I/O ports at a given time based on the logic states of the activation signals $ACT_1$ through $ACT_X$. For example, a given one of the activation signals ACT can be asserted at a given time to activate the second SLCFET switch system 508 of a first one of the complementary switch systems 502 to route an RF signal from the respective I/O port of the complementary switch system 502 to the I/O terminal. In this example, the other activation signals can be de-asserted to activate the first SLCFET switch systems 506 of each of the other complementary switch systems 502 to couple the respective I/O terminals of the other complementary switch systems 502 to ground. Therefore, the I/O ports of the other complementary switch systems 502 can be isolated from the I/O terminal to facilitate RF communication between the I/O port of the first one of the complementary switch systems 502 and the I/O terminal.

Figure 6:
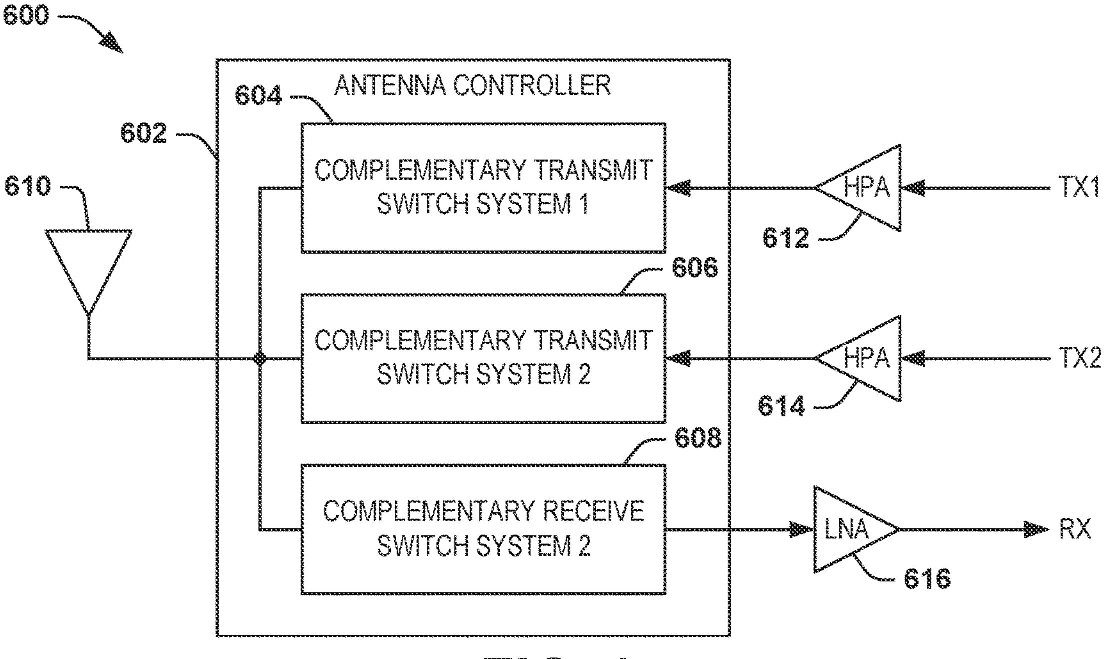
FIG. 6 illustrates an example diagram of an RF antenna system.

FIG. 6 illustrates an example diagram of an RF antenna system 600. The RF antenna system 600 includes an antenna controller 602. The antenna controller 602 can correspond to an example of the RF switching system 500 in the example of FIG. 5. Therefore, reference is to be made to the example of FIG. 5 in the following description of the example of FIG. 6.

In the example of FIG. 6, the antenna controller 602 includes a first complementary transmit switch system 604, a second complementary transmit switch system 606, and a complementary receive switch system 608. Each of the complementary switch systems 604, 606, and 608 can correspond to a respective one of the complementary switch systems 502 in the example of FIG. 5, and can thus each include a first SLCFET switch system 506 interconnecting a complement node 510 to ground and a second SLCFET switch system 508 interconnecting the complement node 510 and the common node 512. Additionally, each of the complementary switch systems 604, 606, and 608 are demonstrated as coupled to an antenna 610 that is configured to transmit and receive wireless RF signals. The antenna 610 can be coupled to the I/O terminal in the example of FIG. 5, and can thus be coupled to the common node 512 via the I/O terminal matching network 516.

The RF antenna system 600 also includes a first high power amplifier ("HPA") 612 that is coupled to the first complementary transmit switch system 604 and a second high power amplifier ("HPA") 614 that is coupled to the second complementary transmit switch system 606. The first high power amplifier 612 is configured to amplify a first transmit signal TX1 that is provided to the first complementary transmit switch system 604 and the second high power amplifier 614 is configured to amplify a second transmit signal TX2 that is provided to the second complementary transmit switch system 606. Additionally, the RF antenna system 600 includes a low noise amplifier ("LNA") 616 that is coupled to the complementary receive switch system 608. The LNA 616 is configured to amplify a receive signal RX that is provided from the complementary receive switch system 608.

As a first example, the activation signal ACT of the first complementary transmit switch system 604 can be asserted to activate the SLCFETs of the second SLCFET switch system 508 of the first complementary transmit switch system 604. The activation signals ACT of the second complementary transmit switch system 606 and the complementary receive switch system 608 can be de-asserted to activate the SLCFETs of the first SLCFET switch system 506 of each of the second complementary transmit switch system 606 and the complementary receive switch system 608. Therefore, the first transmit signal TX1 can be amplified by the first high power amplifier 612 and routed to the antenna 610 via the second SLCFET switch system 508 of the first complementary transmit switch system 604 for transmission from the antenna 610. The signal paths for the second transmit signal TX2 and the receive signal RX can be isolated via the first SLCFET switch system 506 of each of the second complementary transmit switch system 606 and the complementary receive switch system 608.

As a second example, the activation signal ACT of the second complementary transmit switch system 606 can be asserted to activate the SLCFETs of the second SLCFET switch system 508 of the second complementary transmit switch system 606. The activation signals ACT of the first complementary transmit switch system 604 and the complementary receive switch system 608 can be de-asserted to activate the SLCFETs of the first SLCFET switch system 506 of each of the first complementary transmit switch system 604 and the complementary receive switch system 608. Therefore, the second transmit signal TX2 can be amplified by the second high power amplifier 614 and routed to the antenna 610 via the second SLCFET switch system 508 of the second complementary transmit switch system 606 for transmission from the antenna 610. The signal paths for the first transmit signal TX1 and the receive signal RX can be isolated via the first SLCFET switch system 506 of each of the first complementary transmit switch system 604 and the complementary receive switch system 608.

As a third example, the activation signal ACT of the complementary receive switch system 608 can be asserted to activate the SLCFETs of the second SLCFET switch system 508 of the complementary receive switch system 608. The activation signals ACT of the first and second complementary transmit switch systems 604 and 606 can be de-asserted to activate the SLCFETs of the first SLCFET switch system 506 of each of the first and second complementary transmit switch systems 604 and 606. Therefore, the receive signal RX can be received from the antenna 610, routed through the second SLCFET switch system 508 of the complementary receive switch system 608, and amplified by the LNA 616. The signal paths for the first and second transmit signals TX1 and TX2 can be isolated via the first SLCFET switch system 506 of each of the first and second complementary transmit switch systems 604 and 606.

Figure 7:
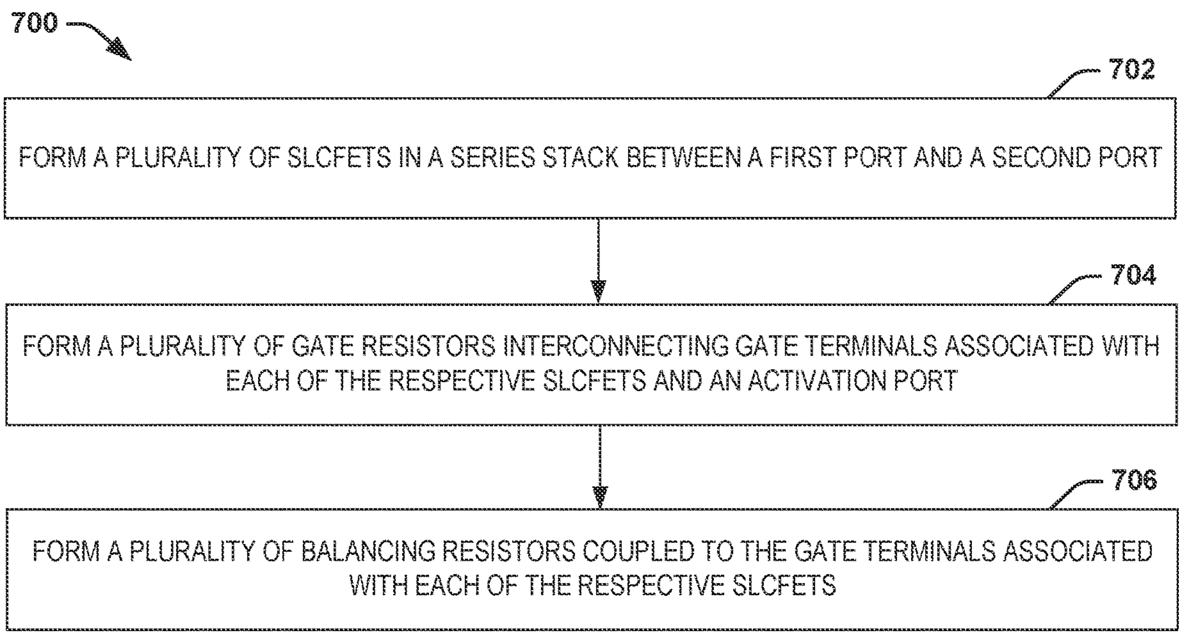
FIG. 7 illustrates an example of a method for fabricating a SLCFET switch system.

In view of the foregoing structural and functional features described above, a methodology in accordance with various aspects of the disclosure will be better appreciated with reference to FIG. 7. It is to be understood and appreciated that the method of FIG. 7 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

FIG. 7 illustrates an example of a method 700 for fabricating a SLCFET switch system (e.g., the SLCFET switch system 100). At 702, forming a plurality of SLCFETs (e.g., the SLCFETs 102) in a series stack between a first port (e.g., the first port 202) and a second port (e.g., the second port 204). At 704, forming a plurality of gate resistors (e.g., the gate resistors $R_{G1}$ through $R_{GN}$) interconnecting gate terminals associated with each of the respective SLCFETs and an activation port (e.g., the activation port 206). At 706, forming a plurality of balancing resistors (e.g., the balancing resistors $R_{B1}$ through $R_{BN}$) coupled to the gate terminals associated with each of the respective SLCFETs.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A super-lattice castellated field effect transistor (SLCFET) system comprising:

a plurality of SLCFETs arranged in a series stack between a first port and a second port to provide a propagation path of a radio frequency (RF) signal between the first port and the second port in response to activation of the SLCFETs;

a plurality of gate resistors interconnecting gate terminals associated with each of the respective SLCFETs and an activation port to which an activation signal is provided to concurrently activate the SLCFETs; and a plurality of balancing resistors coupled to the gate terminals associated with each of the respective SLCFETs, the balancing resistors being configured to provide a current path for a balancing current associated with the RF signal to approximately equalize a drain-gate voltage and a gate-source voltage associated with each of the SLCFETs when activated, wherein the balancing current is approximately equal to a gate current through each of the gate resistors when the SLCFETs are activated.

2. The system of claim 1, further comprising a DC-blocking capacitor coupled to one of the balancing resistors, wherein the DC-blocking capacitor is configured to filter DC current in the current path.

3. The system of claim 2, wherein the balancing resistors comprise a first balancing resistor and a plurality of remaining balancing resistors, wherein one of the SLCFETs is coupled to the first port, wherein the first balancing resistor is arranged in series with the DC-blocking capacitor between a gate terminal and a drain terminal of the respective one of the SLCFETs.

4. The system of claim 3, wherein each of the remaining balancing resistors is arranged as interconnecting the gate terminals of a pair of the SLCFETs.

5. The system of claim 1, further comprising a plurality of DC-blocking capacitors, wherein each of the DC-blocking capacitors is arranged in series with a respective one of the balancing resistors between a gate terminal and a drain terminal of a respective one of the SLCFETs, wherein each of the DC-blocking capacitors is configured to filter DC current in the current path associated with the respective one of the SLCFETs.

6. The system of claim 1, further comprising:

a plurality of feedforward capacitors arranged in parallel with each of the respective plurality of SLCFETs; and a plurality of shunt resistors arranged in parallel with each of the respective plurality of SLCFETs.

7. A complementary switch system comprising the SLCFET system of claim 1, wherein the SLCFET system is a first SLCFET system coupled to a complement node at the first port and a low-voltage terminal at the second port, the complementary switch system further comprising:

an input/output (I/O) port impedance matching network arranged between an I/O port and the complement node;

a second SLCFET system coupled between the complement node at the first port of the second SLCFET system and a common node at the second port of the SLCFET system, wherein the SLCFETs of the second SLCFET system are activated via a complement of the activation signal; and an I/O terminal impedance matching network arranged between an I/O terminal and the common node.

8. An RF switch system comprising the complementary switch system of claim 7, wherein the RF switch system comprises a plurality of complementary switch systems, wherein the I/O port impedance matching network of each of the complementary switch systems is arranged between the I/O port and the complement node of the respective one of the complementary switch systems, wherein the second SLCFET system of each of the complementary switch systems is coupled between the complement node of the respective one of the complementary switch systems and the common node.

9. An RF antenna system comprising the RF switch system of claim 8, further comprising:

an antenna coupled to the I/O terminal, the antenna being configured to transmit a transmit RF signal during a transmit mode and to receive a received RF signal during a receive mode;

at least one low-noise amplifier coupled to the I/O port of at least one of the complementary switch systems to amplify the received RF signal propagating through the second SLCFET system of the at least one of the complementary switch systems during the receive mode, the transmitted RF signal being shunted through the first SLCFET system of the at least one of the complementary switch systems during the transmit mode; and at least one high-power amplifier coupled to the I/O port of at least one other of the complementary switch systems to amplify the transmitted RF signal propagating through the second SLCFET system of the at least one other of the complementary switch systems during the transmit mode, the received RF signal being shunted through the first SLCFET system of the at least one of the complementary switch systems during the receive mode.

10. A method for fabricating a super-lattice castellated field effect transistor (SLCFET), the method comprising:

forming a plurality of SLCFETs in a series stack between a first port and a second port to provide a propagation path of a radio frequency (RE) signal between the first port and the second port in response to activation of the SLCFETs;

forming a plurality of gate resistors interconnecting gate terminals associated with each of the respective SLCFETs and an activation port; and forming a plurality of balancing resistors coupled to the gate terminals associated with each of the respective SLCFETs, the balancing resistors being configured to provide a current path for a balancing current associated with the RF signal, wherein the balancing current is approximately equal to a gate current through each of the gate resistors when the SLCFETs are activated.

11. The method of claim 10, further comprising forming a DC-blocking capacitor coupled to the first port, wherein forming the balancing resistors comprises:

forming a first balancing resistor in series with the DC-blocking capacitor between the first port and the gate terminal of a first one of the SLCFETs; and forming the remaining balancing resistors interconnecting gate terminals of each of consecutive pairs of the SLCFETs.

12. The method of claim 10, wherein forming the balancing resistors comprises forming a plurality of DC-blocking capacitors in a series connection with a respective one of the balancing resistors between a gate terminal and a drain terminal of each of the SLCFETs.

13. The method of claim 10, further comprising:

forming a plurality of feedforward capacitors in parallel with each of the respective plurality of SLCFETs; and forming a plurality of shunt resistors in parallel with each of the respective plurality of SLCFETs.

14. The method of claim 10, wherein forming the plurality of SLCFETs comprises forming a source terminal of a first one of the SLCFETs and forming a drain terminal of a second one of the SLCFETs as integral with respect to a metal material for the respective source and drain terminals.

15. A complement switch system comprising:

an input/output (I/O) port impedance matching network arranged between an I/O port and a complement node;

an I/O terminal impedance matching network arranged between an I/O terminal and the common node;

a first super-lattice castellated field effect transistor (SLCFET) system comprising:

a first plurality of SLCFETs arranged in a first series stack between the complement node and a low voltage rail to provide a propagation path of a radio frequency (RF) signal between the complement node and the low-voltage rail in response to activation of the first SLCFETs;

a first plurality of gate resistors interconnecting gate terminals associated with each of the respective first SLCFETs and a first activation port to which an activation signal is provided to concurrently activate the first SLCFETs; and a first plurality of balancing resistors coupled to the gate terminals associated with each of the respective first SLCFETs, the first balancing resistors being configured to provide a first current path for a first balancing current associated with the RF signal to approximately equalize a drain-gate voltage and a gate-source voltage associated with each of the first SLCFETs when activated, wherein the first balancing current is approximately equal to a gate current through each of the gate resistors when the SLCFETs are activated; and a second SLCFET system comprising:

a second plurality of SLCFETs arranged in a second series stack between the common node and the complement node to provide a propagation path of the RF signal between the common node and the complement node in response to activation of the second SLCFETs;

a second plurality of gate resistors interconnecting the gate terminals associated with each of the respective second SLCFETs and a second activation port to which a complement of the activation signal is provided to concurrently activate the second SLCFETs; and a second plurality of balancing resistors coupled to the gate terminals associated with each of the respective second SLCFETs, the second balancing resistors being configured to provide a second current path for a second balancing current associated with the RF signal to approximately equalize a drain-gate voltage and a gate-source voltage associated with each of the second SLCFETs when activated, wherein the second balancing current is approximately equal to a gate current through each of the gate resistors when the SLCFETs are activated.

16. The system of claim 15, wherein each of at least one of the first balancing resistors are arranged as interconnecting the gate terminals of a pair of the first SLCFETs, wherein the first SLCFET system further comprises a first DC-blocking capacitor coupled to one of the first balancing resistors to filter DC current in the first current path through the first balancing resistors, wherein each of at least one of the second balancing resistors are arranged as interconnecting the gate terminals of a pair of the second SLCFETs, wherein the second SLCFET system further comprises a second DC-blocking capacitor coupled to one of the second balancing resistors to filter DC current in the second current path through the second balancing resistors.

17. The system of claim 15, wherein the first SLCFET system comprises a plurality of first DC-blocking capacitors, wherein each of the first DC-blocking capacitors is arranged in series with a respective one of the first balancing resistors between a gate terminal and a drain terminal of a respective one of the first SLCFETs, wherein each of the first DC-blocking capacitors is configured to filter DC current in the first current path associated with the respective one of the first SLCFETs, wherein the second SLCFET system comprises a plurality of second DC-blocking capacitors, wherein each of the second DC-blocking capacitors is arranged in series with a respective one of the second balancing resistors between a gate terminal and a drain terminal of a respective one of the second SLCFETs, wherein each of the second DC-blocking capacitors is configured to filter DC current in the second current path associated with the respective one of the second SLCFETs.

18. An RF switch system comprising the complementary switch system of claim 15, wherein the RF switch system comprises a plurality of complementary switch systems, wherein the I/O port impedance matching network of each of the complementary switch systems is arranged between the I/O port and the complement node of the respective one of the complementary switch systems, wherein the second SLCFET system of each of the complementary switch systems is coupled between the complement node of the respective one of the complementary switch systems and the common node.

19. An RF antenna system comprising the RF switch system of claim 18, further comprising:

an antenna coupled to the I/O terminal, the antenna being configured to transmit a transmit RF signal during a transmit mode and to receive a received RF signal during a receive mode;

at least one low-noise amplifier coupled to the I/O port of at least one of the complementary switch systems to amplify the received RF signal propagating through the second SLCFET system of the at least one of the complementary switch systems during the receive mode, the transmitted RF signal being shunted through the first SLCFET system of the at least one of the complementary switch systems during the transmit mode; and at least one high-power amplifier coupled to the I/O port of at least one other of the complementary switch systems to amplify the transmitted RF signal propagating through the second SLCFET system of the at least one other of the complementary switch systems during the transmit mode, the received RF signal being shunted through the first SLCFET system of the at least one of the complementary switch systems during the receive mode.

* * * * *